United States Patent
Farcasiu

(10) Patent No.: US 7,840,631 B2
(45) Date of Patent: Nov. 23, 2010

(54) MULTIMEDIA CONTROL WITH ONE-CLICK DEVICE SELECTION

(75) Inventor: Alexandru M. Farcasiu, Southlake, TX (US)

(73) Assignee: Good Technology, Inc., Santa Clara, CA (US)

( * ) Notice: Subject to any disclaimer, the term of this patent is extended or adjusted under 35 U.S.C. 154(b) by 1778 days.

(21) Appl. No.: 10/434,967

(22) Filed: May 9, 2003

(65) Prior Publication Data
US 2004/0224723 A1 Nov. 11, 2004

(51) Int. Cl.
*G06F 15/16* (2006.01)
*G06F 15/173* (2006.01)
*G06F 7/00* (2006.01)

(52) U.S. Cl. .................. 709/200; 709/218; 709/226; 709/231; 707/104.1

(58) Field of Classification Search .................. 709/218, 709/226, 231, 200; 707/104.1
See application file for complete search history.

(56) References Cited

U.S. PATENT DOCUMENTS

| 7,170,857 | B2 * | 1/2007 | Stephens et al. | 370/230 |
| 2003/0020671 | A1 * | 1/2003 | Santoro et al. | 345/1.3 |
| 2003/0041111 | A1 * | 2/2003 | Delaney et al. | 709/206 |
| 2004/0213271 | A1 * | 10/2004 | Lovy et al. | 370/401 |

* cited by examiner

*Primary Examiner*—Jude J Jean Gilles
*Assistant Examiner*—Clarence John
(74) *Attorney, Agent, or Firm*—Knobbe Martens Olson & Bear LLP

(57) ABSTRACT

Embodiments of a system and method for initiating multimedia control are disclosed. One embodiment comprises a means for discovering a media device including establishing communication with the media device, identifying media formats which the media device supports, and identifying variables to control media device playback; a means for delegating to the media device responsibility for playback of a media content including selecting the media device with a one-click selection and identifying to the media device the media content to be played back; and a means for controlling the media device playback.

13 Claims, 10 Drawing Sheets

MULTIMEDIA CONTROL WITH ONE-CLICK DEVICE SELECTION

TECHNICAL FIELD

The invention relates in general to communication systems, and in particular to information exchange between an intelligent device and an intelligent media device involving delegation of responsibility for playback of media content initiated by one-click selection.

BACKGROUND INFORMATION

Currently users of intelligent devices—a very broad class of devices including personal computers ("PC"s), handheld computers, smart phones, and other devices—are able to access data saved in many formats. Text, audio clips, and video clips are some of the information formats that can be accessed. Often this information is generally referred to as "content."

Content is generally accessed by running a computer program or application which knows how to display and interact with the content file. A spreadsheet file, for example, may be accessed by starting an associated spread sheet application using the content file as the information to be displayed. A word processing file, for example, may be accessed by starting an associated word processing application using the content file as the information to be displayed. Similarly, an audio file may be played by a media player application using a content file, such as an mp3 file. Additionally, links to content on a network can be embedded in documents such as HTML web pages and in email. When the user selects the embedded link, the appropriate application is invoked automatically, information about where to retrieve the content is passed to the application, and the responsibility for fetching and processing the referenced content is delegated to this application.

Some media formats, however, are poorly supported by mobile devices. It is often difficult to read a long email text on a mobile device because of the small size of the mobile's display. Additionally, the display of the mobile may not support the displaying of video or audio files.

Today we live in a richly networked environment. While our mobile device may have limited capability of handling content, a capable media device may be near to the mobile user. Such a media device might play the content with much greater fidelity than possible on the mobile device.

What is needed, therefore, is a system and method to initiate cooperative communication between a mobile device and a capable media device to enable the media device to play back content initiated by the mobile device.

SUMMARY

Embodiments of a system and method for initiating multimedia control are disclosed. One embodiment includes a means for discovering a media device including establishing communication with the media device, identifying media formats which the media device supports, and identifying variables to control media device playback; a means for delegating to the media device responsibility for playback of a media content.

BRIEF DESCRIPTION OF THE DRAWINGS

FIG. 2b is a graphic representation of embodiments of computer instructions residing in a memory of the exemplary mobile intelligent device of FIG. 2a.

FIG. 3b is a graphic representation of embodiments of computer instructions residing in a memory of the exemplary intelligent media device of FIG. 3a.

DETAILED DESCRIPTION OF THE INVENTION

The present disclosure provides a unique method and system for performing information exchange between an intelligent device and an intelligent media device involving delegation of responsibility for playback of content initiated by one-click selection. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
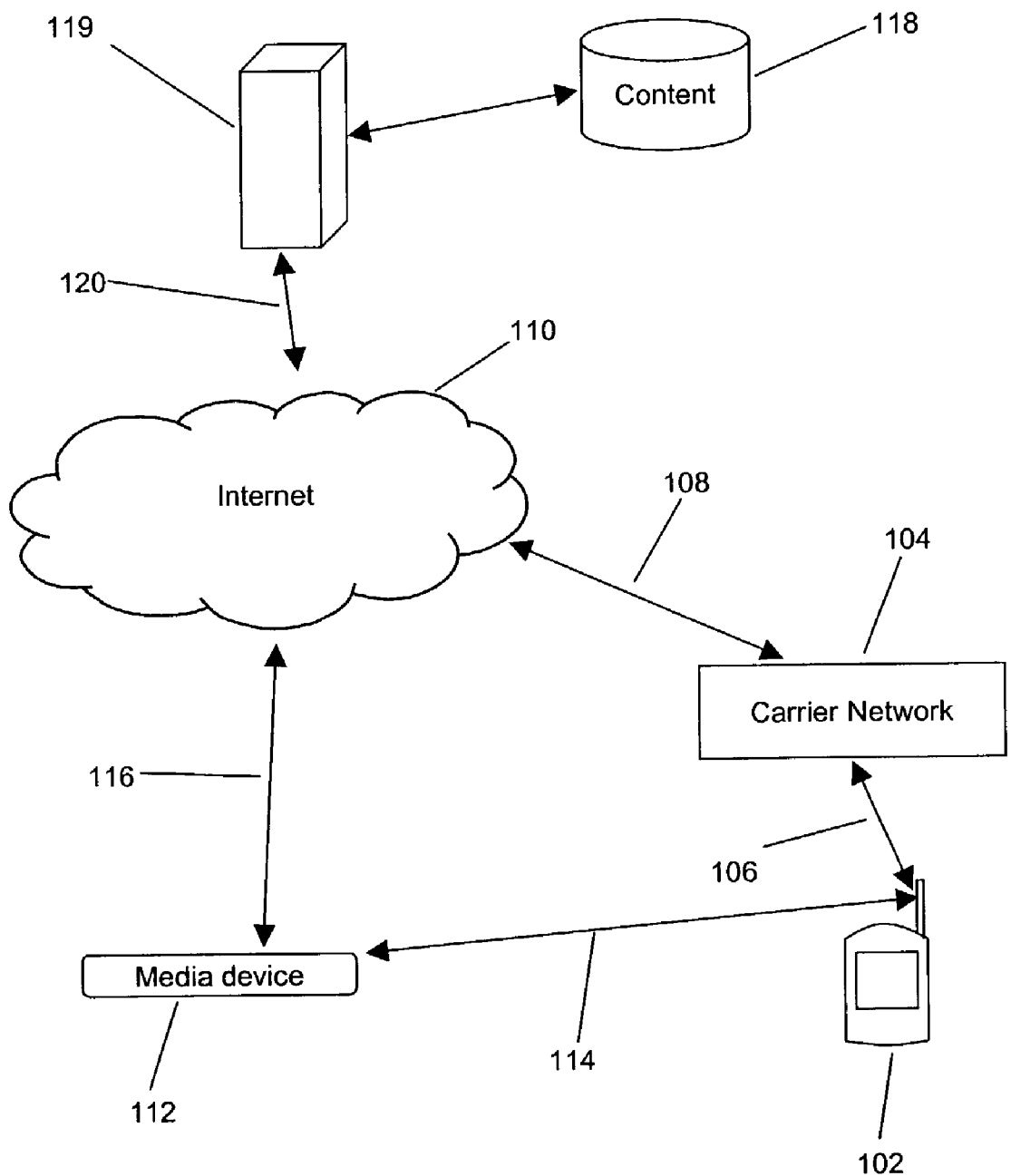
FIG. 1 depicts an exemplary communication system which might be used to implement various embodiments of the present invention.

Turning now to FIG. 1, an exemplary communication system and network 100 is shown which might be used to implement various embodiments of the present invention. A mobile intelligent device 102 is shown in wireless communication with a carrier network 104 via a radio frequency ("RF") link 106. The carrier network 104 may be a cellular network and might include such components as base station transmitter systems ("BTS") which communicate with mobile devices within their cell areas via RF communications links using a standard cellular phone air interface protocol, Base Station Controllers ("BSC") which perform various intelligent control functions for the BTSs, and mobile switching centers ("MSC") which route voice and data traffic onto and off of the public switched telephone network ("PSTN"). The carrier network may be in communication with a public network 110, such as the Internet, via a high speed connection 108.

The mobile 102 may be in communication with an intelligent media device 112 via a RF link 114. In the illustrative embodiment, the mobile 102 has a wide area network modem (not shown) for communicating with the carrier network 104 via a radio link 106. The mobile 102 may also have a local area network modem (not shown) for communicating with a media device 112 via a local area access protocol over the RF link 114. In turn, the media device 112 may be in communication with the network 110 via a high speed connection 116.

A media server 119 may also be in communication with the network 110 via a connection 120, the media server being in communication with a content store or database 118. The content database 118 may contain video files, audio files, or text files.

Figure 2A:
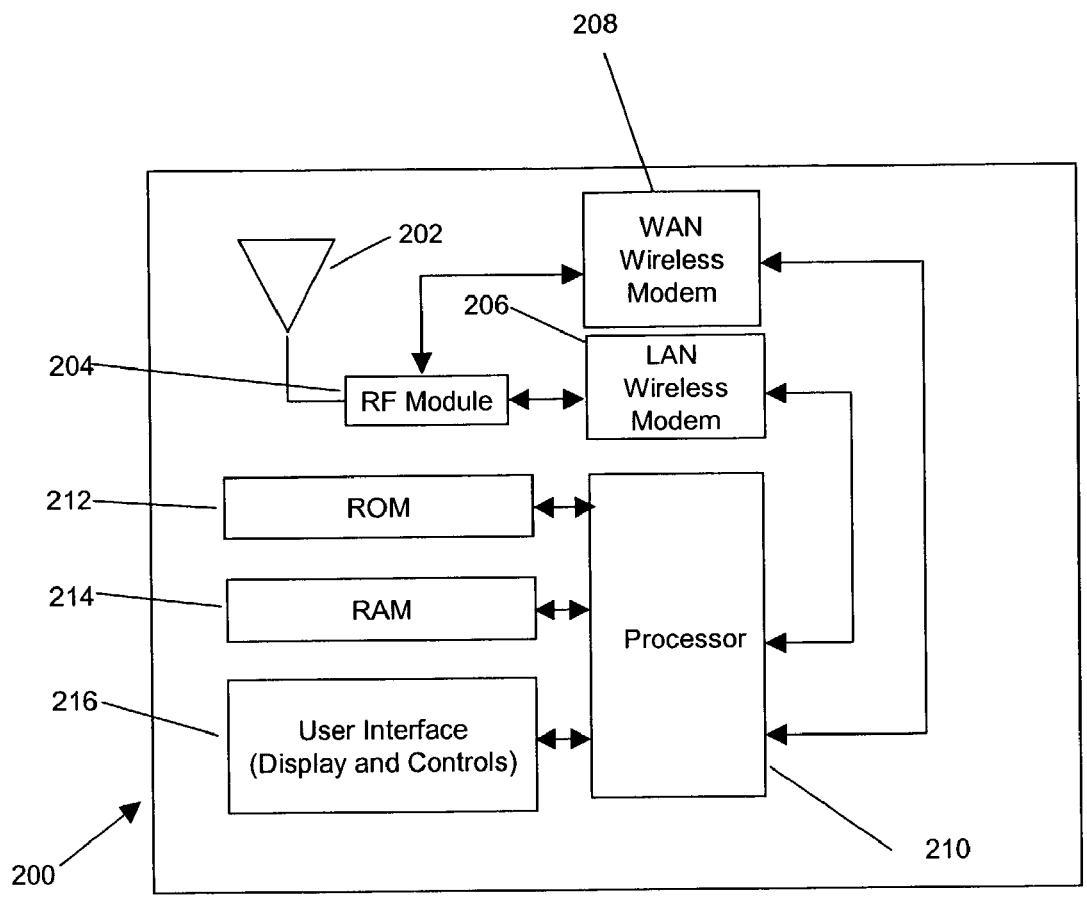
FIG. 2a depicts an exemplary mobile intelligent device which might be used to implement various embodiments of the present invention.

Turning now to FIG. 2a, there is presented a simplified block diagram of one embodiment of an exemplary mobile intelligent device 200. In this illustrative embodiment, an RF antenna 202 is connected to an RF module 204. The antenna 202 receives and transmits communications signals. The RF module 204 converts base band information into an RF format and amplifies the signal to a power level suitable to transmission and converts received RF signals to base band information suitable to processing within the mobile 200. The RF Module 204 may be connected to a local area network ("LAN") wireless modem 206 and/or to a wide area network ("WAN") wireless model 208. The LAN wireless modem 206 and WAN wireless modem 208 are in communication with a processor 210. The LAN wireless modem 206 receives signals from the processor 210 which it modulates and sends to the RF module 204. The LAN wireless modem 206 receives signals from the RF module 204 which it demodulates and sends to the processor 210. The WAN wireless modem 208 receives signals from the processor 210 which it modulates and sends to the RF module 204. The WAN wireless modem 208 receives signals from the RF module 204 which it demodulates and sends to the processor 210.

In the illustrative embodiment, the processor 210 controls the basic operations of the mobile intelligent device 200. The processor 210 may be coupled to one or more memory devices, such as random access memory "RAM" 214. The RAM 214 may be used for the temporary storage of data used in processing signals and the operation of the intelligent mobile device 200. In some embodiments, the processor 210 reads instructions, such as processing and operating logic from a set of read-only memory "ROM" 212. In other embodiments, ROM 212 could be flash memory or another non-volatile form of memory and the processor 210 may be one or more processors or circuits. A user interface 216 provides a display and control inputs. The user interface 216 may be in communication with the processor 210 by a plurality of electrical conductors which permit the processor 212 to control the display and to receive inputs.

Figure 2B:
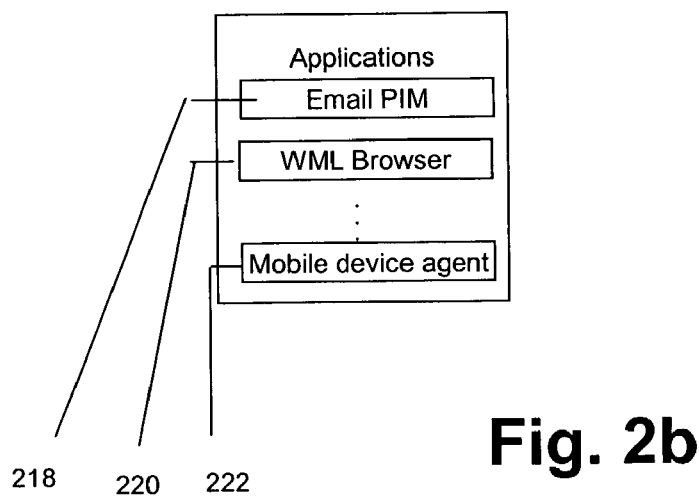

Typically the processor 210 will execute computer programs, called "applications," including an email PIM 218 application and a WML browser 220 application as shown in FIG. 2b. Additionally, the mobile 200 may run a Mobile Device Agent (MoDA) application 222. In several exemplary embodiments, the Mobile MoDA application keeps track of all media devices offering services in the current location. The MoDA may import a list of supported format extensions from the detected media devices. Different applications running on the mobile device may be MoDA enabled in order to take advantage of the services offered. Thus, in several exemplary embodiments, when an application like an email viewer or WAP browser are started they will retrieve a list of all media devices that support the documents hyperlinked to their content and display the according media device on the bottom of the screen when the hyperlink is in focus. If the user selects the hyperlink the active application transmits the link value to the MoDA. The MoDA contacts the media device, transmits the link and if the feature is implemented retrieves the media device controls.

Figure 3A:
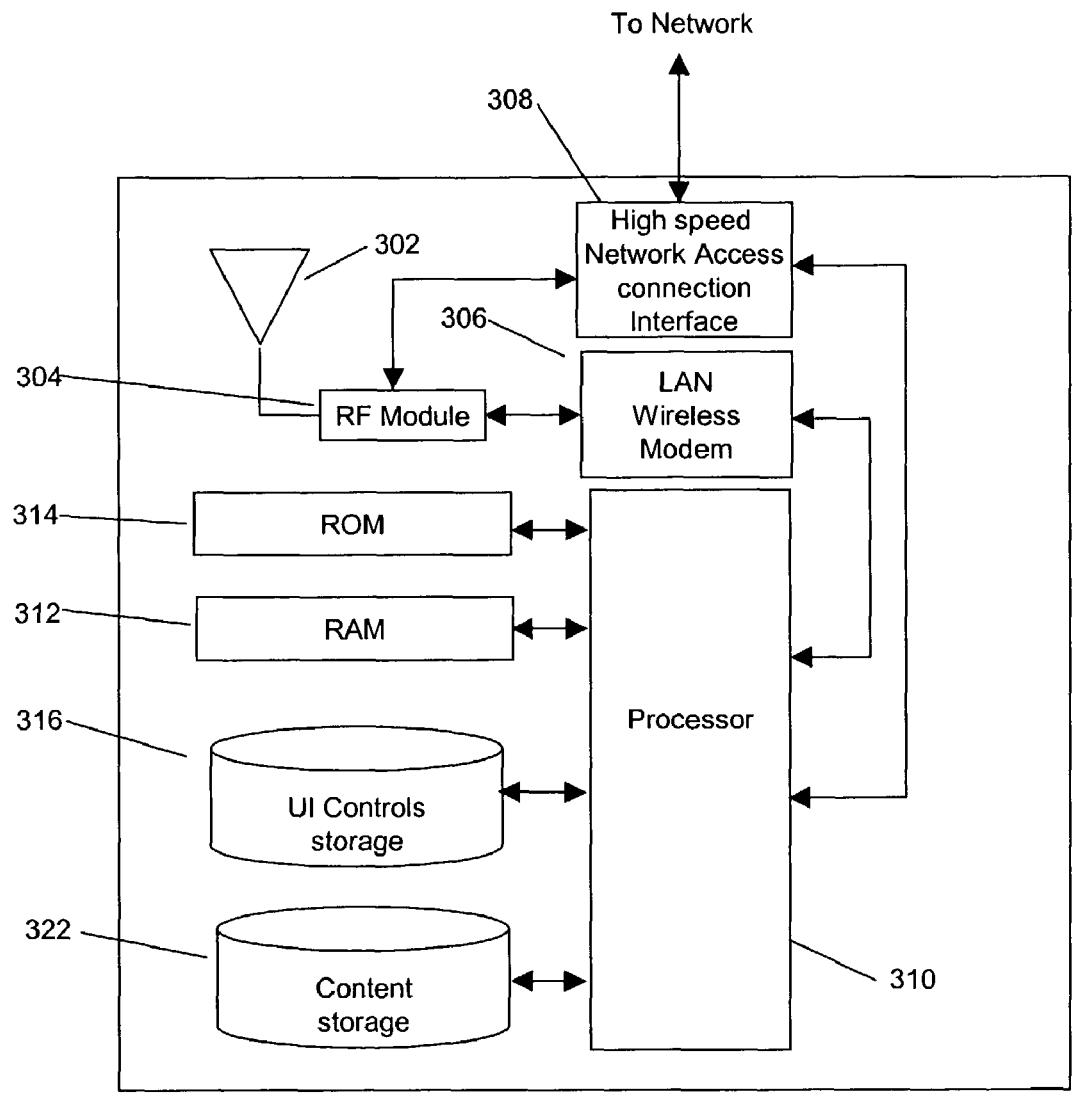
FIG. 3a depicts an exemplary intelligent media device which might be used to implement various embodiments of the present invention.

Turning now to FIG. 3a, an exemplary intelligent media device 300 is depicted. An RF antenna 302 is connected to an RF module 304. The antenna 302 receives and transmits communications signals. The RF module 304 converts baseband information into an RF format suitable to transmission and converts received RF signals to baseband information suitable to processing within the media device 300. The RF module 304 may be connected to a LAN wireless modem 306 and/or to a high speed network access connection 308. The high speed access connection 308 could be any form of a network connection, including a wireless modem in communication with an access point, a wired network card, or some other form of high speed connection to a public network, such as the Internet. The LAN wireless modem 306 and high speed access connection are in communication with a processor 310. The LAN wireless modem 306 receives signals from the processor 310 which it modulates and sends to the RF module 304. The LAN wireless modem 306 receives signals from the RF module 304 which it demodulates and sends to the processor 310.

In the illustrative embodiment, the processor 310 controls the basic operations of the intelligent media device 300. The processor 310 is coupled to one or more memory devices, such as random access memory "RAM" 314. The RAM 314 may be used for the temporary storage of data used in processing signals and the operation of the intelligent media device 300. In some embodiments, the processor 310 reads instructions, such as processing and operating logic from a set of read-only memory "ROM" 314. In other embodiments, ROM 314 could be flash memory or another non-volatile form of memory and the processor 310 may be one or more processors or circuits.

The processor 310 may also be coupled to one or more storage devices. For instance, a user interface ("UI") controls storage 316 may be used to store characterizations of the control signals the media device 300 will respond to. Additionally, some embodiments may have a storage 322 for locally stored content. The processor 310 supports execution of media device software.

Figure 3B:
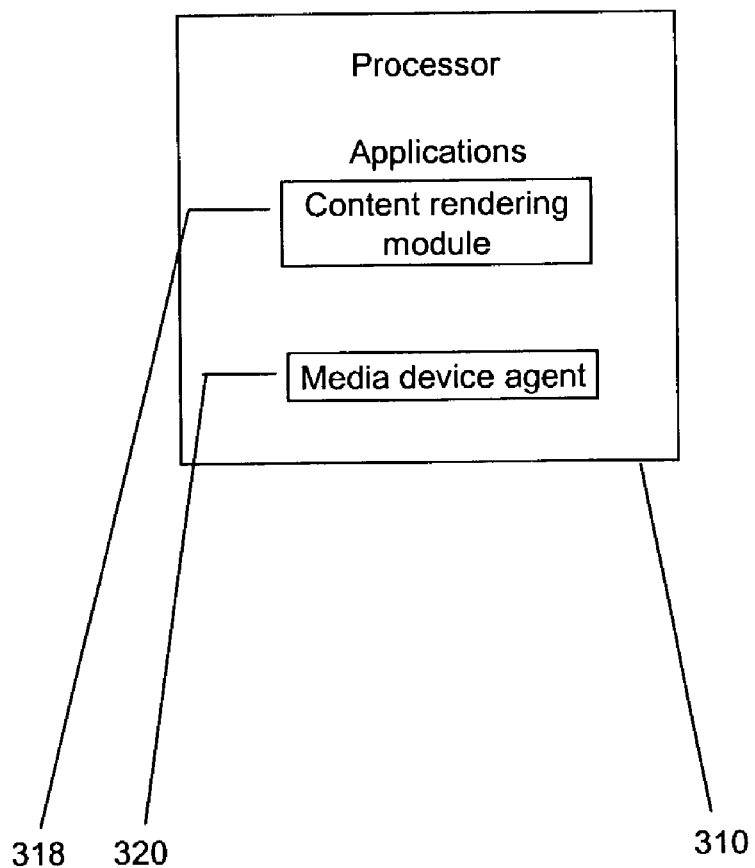

Typically the processor 310 will execute computer programs as illustrated in FIG. 3b. One such application may be a content rendering module 318 which will be employed by the processor 310 to playback media content. A Media Device Agent (MeDA) 320 may provide general intelligent functions for the media device 300. In several exemplary embodiments, the MeDA 320 keeps track of data formats that can be rendered by the media device registers its service with a device discovery server, waits for links to content that applications running on the media device can process and if requested by an MoDA it may be able to export media device controls that can be used by the mobile device to control the rendering. For example if the media device is a multimedia computer, the MeDA 320 may be able to access the registry to retrieve the information that allows it to associate a certain file extension with an application executable. The implementation of the MeDA while offering an identical interface to the MoDA may different significantly from one media device to an other.

When the mobile 102 moves into physical proximity to the media device 112 the two devices are adapted to discover each other. The concept of 'discovery' involves devices which do not know of each other's existence learning of each other's existence and then establishing two-way communications. In one embodiment, both of these devices may periodically probe for other wireless devices in their proximity, using some standard protocol, with which they may communicate. Upon establishing this communication link, the devices may exchange addressing information as well as information defining their capabilities and their willingness to provide services to clients. In some embodiments, mechanisms may be provided to secure these devices from denial of service attacks, from information theft, and other undesired invasions or misuses. In some embodiments the media device 112 may only listen for a discovery initiation message from intelligent devices rather than itself periodically broadcasting a discovery initiation message also.

Figure 4:
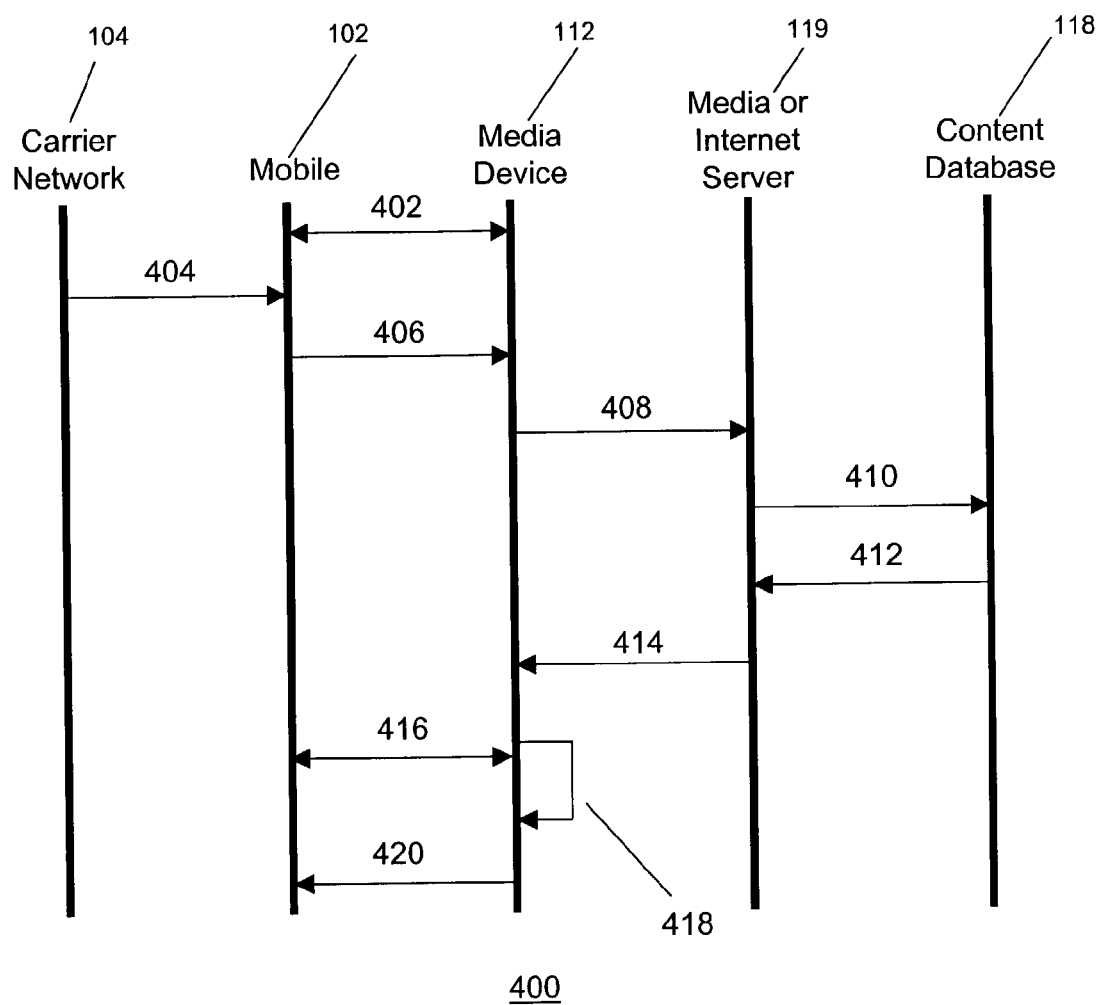
FIG. 4 depicts a communication sequence diagram depicting a typical sequence of communications involved in a mobile delegating playback responsibility to a media device.

Turning now to FIG. 4, there is one embodiment of a communication sequence 400 diagram which depicts the mobile 102 interacting with the media device 112 to delegate content playback. In this diagram which captures the time ordered sequence of messages, passage of time is associated with moving from the top of the diagram to the bottom of the diagram. Additionally, the dark vertical lines represent the participants in each communication. In step 402, the mobile 102 and the media device 112 conduct discovery or bidirectional handshaking using protocols known in the art. As an example, when an email is transmitted (step 404) by the carrier network 104 to the mobile 102, the mobile 102 displays the email. The mobile user may single-click on an embedded link to content causing the mobile 102 to delegate 406 playback responsibility to the appropriate media device 112. Delegation of playback may include sending a request to the media device 112 to perform playback and sending information identifying the content to be played back (this may be an address indicating where the media device 112 can access the content or there may be some other means of enabling the media device 112 to access the content). The media device 112 sends a request via the internet to a media server 111 to retrieve the content from the content store 118. The media server 111 sends a request 410 to the content store 118 to fetch the content. In response, the content store 118 returns content to the media server 111 (step 412). In step 414, the media server 111 then routes the content to the media device 112. In step 418, the media device 112 commences content playback. Control messages and handshaking 416 pass between the mobile 102 and the media device 112. Optionally, on completion of playback, the media device 112 sends a playback completed message 420 to the mobile 102. In alternative embodiments, the media device could be coupled to its own content store. Such an embodiment may function as a wireless "jukebox."

Figure 5:
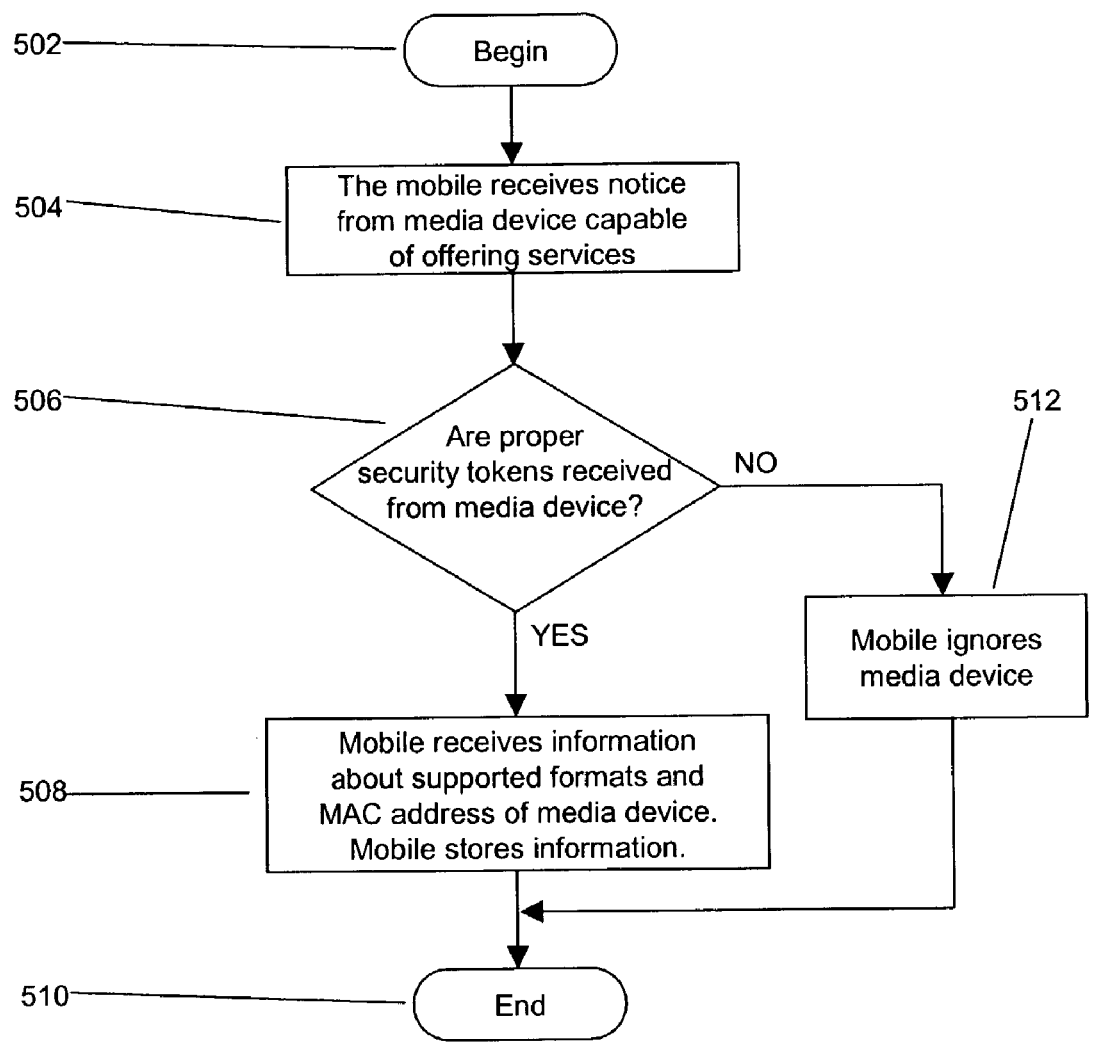
FIG. 5 depicts a logic flow diagram illustrating a discovery process in which a mobile device and a media device establish communications and share information about one another.

FIG. 5 depicts a logic flow diagram showing one possible discovery process by which mobile devices and media devices may exchange information. The process begins at step 502. Assuming the mobile device 102 moves into RF communication range of a media device 112, in step 504, the mobile will receive a notice from the media device of its presence by a standard protocol (802.11 or Bluetooth). In step 506 the mobile 102 determines if it has received the proper security tokens to qualify the media device 112 to be trusted. If the appropriate security tokens are not received, the mobile device 102 ignores the media device 112 and continues to operate in a conventional manner. On the other hand, if the mobile 102 receives the appropriate tokens, the mobile 102 communicates with the media device 112 and receives information enumerating what formats the media device 112 supports and receives the MAC address for the media device 112. Thus, the MoDA and MeDA interact with each other via a device/service discovery protocol.

Figure 6:
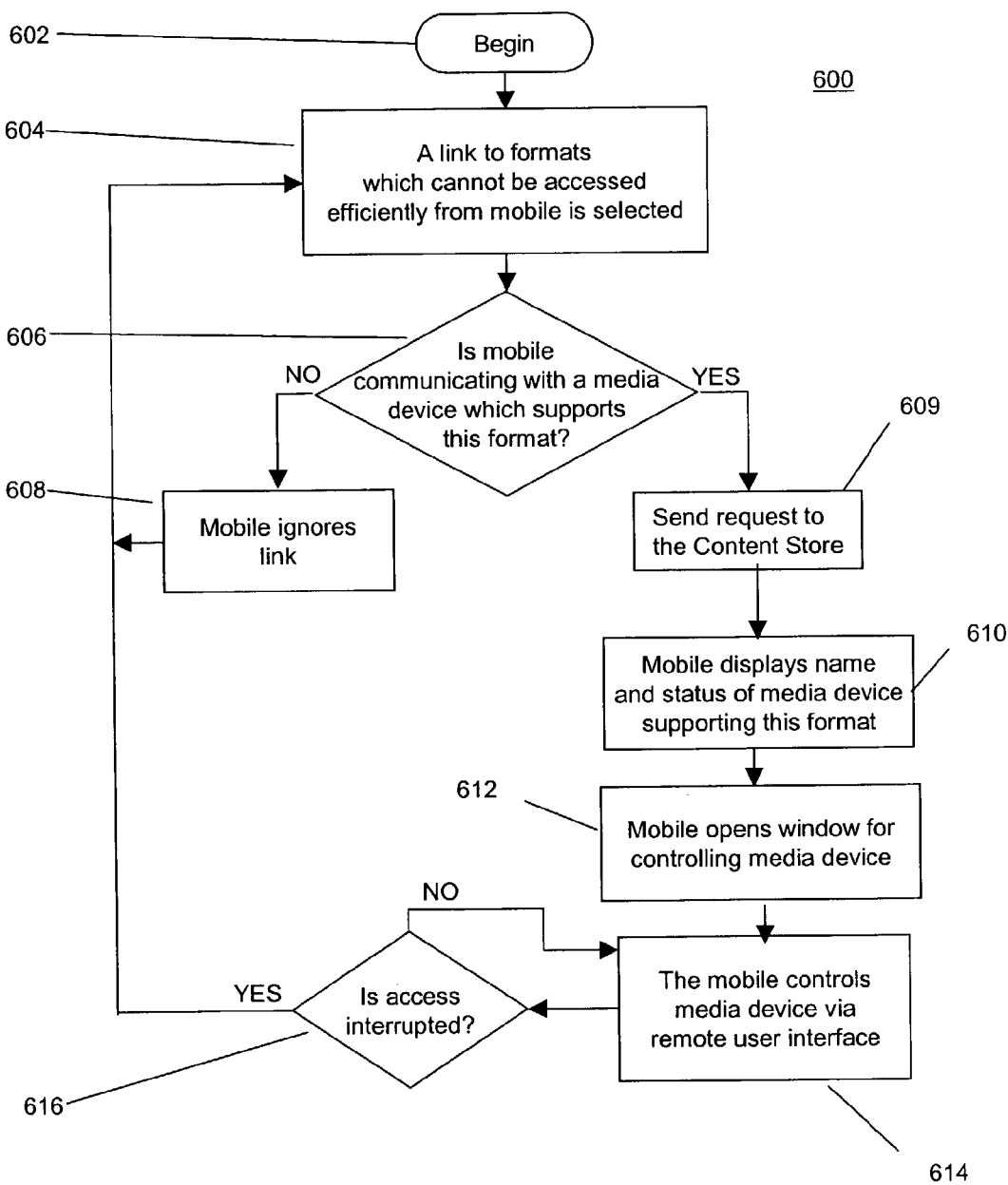
FIG. 6 depicts a logic flow diagram illustrating a content playback delegation and control process for a typical mobile device.

FIG. 6 depicts a logic flow diagram showing an example of media playback. In step 604, the mobile 102 displays a screen (for instance, an email message) having a link to media file which cannot be accessed efficiently by the mobile 102. If the user indicates that this media file is to be played, the process flows to step 606 where a decision may be made: if the mobile 102 is not in communication with a media device 110 which is capable of handling the media format referenced by the link the process flows to step 608. In step 608 the mobile 102 ignores the selected link, and displays a screen letting the user know that there is no media device nearby. The process then flows back to step 604. On the other hand, in step 606 if the mobile 102 is in communication with a media device 110 which is capable of handling the media format referenced by the link, the process flows to step 609. In step 609, a request is sent to the server controlling the content store. In step 610, the mobile 102 displays the name and status of the media device 110 which can support the format of the content referenced by the link. The process flows to step 612 in which the mobile 102 opens a user interface window and displays a control panel for remotely controlling the playback of content on the selected media device 110. The process flows to step 614 in which the mobile 102 actively controls the playback. The process flows to step 616 in which a decision may be made: if the content access is interrupted, the process flows to step 604. If the content access is not interrupted, the process flows back to step 614, thus forming a control loop.

Figure 7:
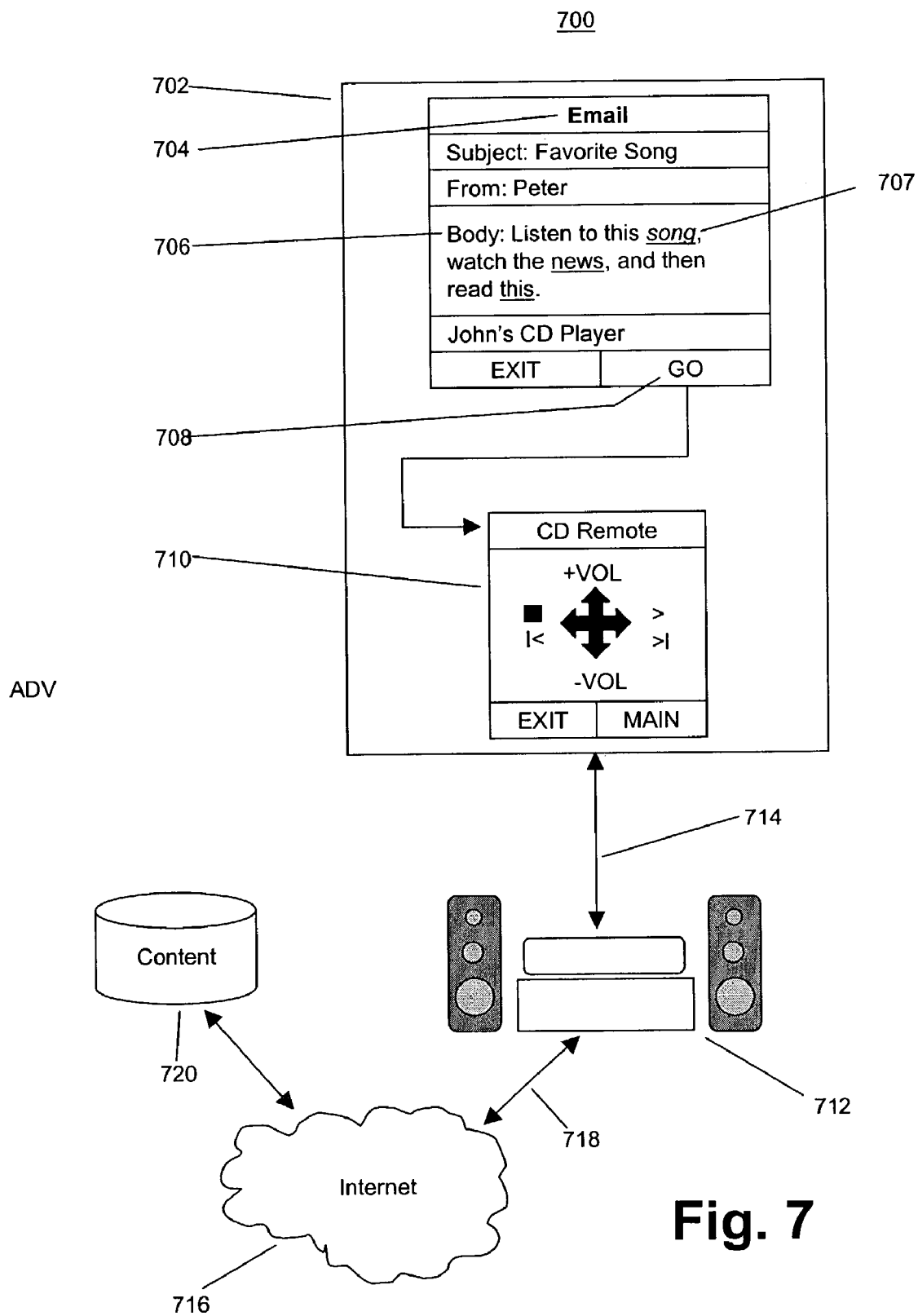
FIG. 7 depicts the delegation of content playback responsibility by a mobile to a network enabled intelligent CD playback device.
Figure 8:
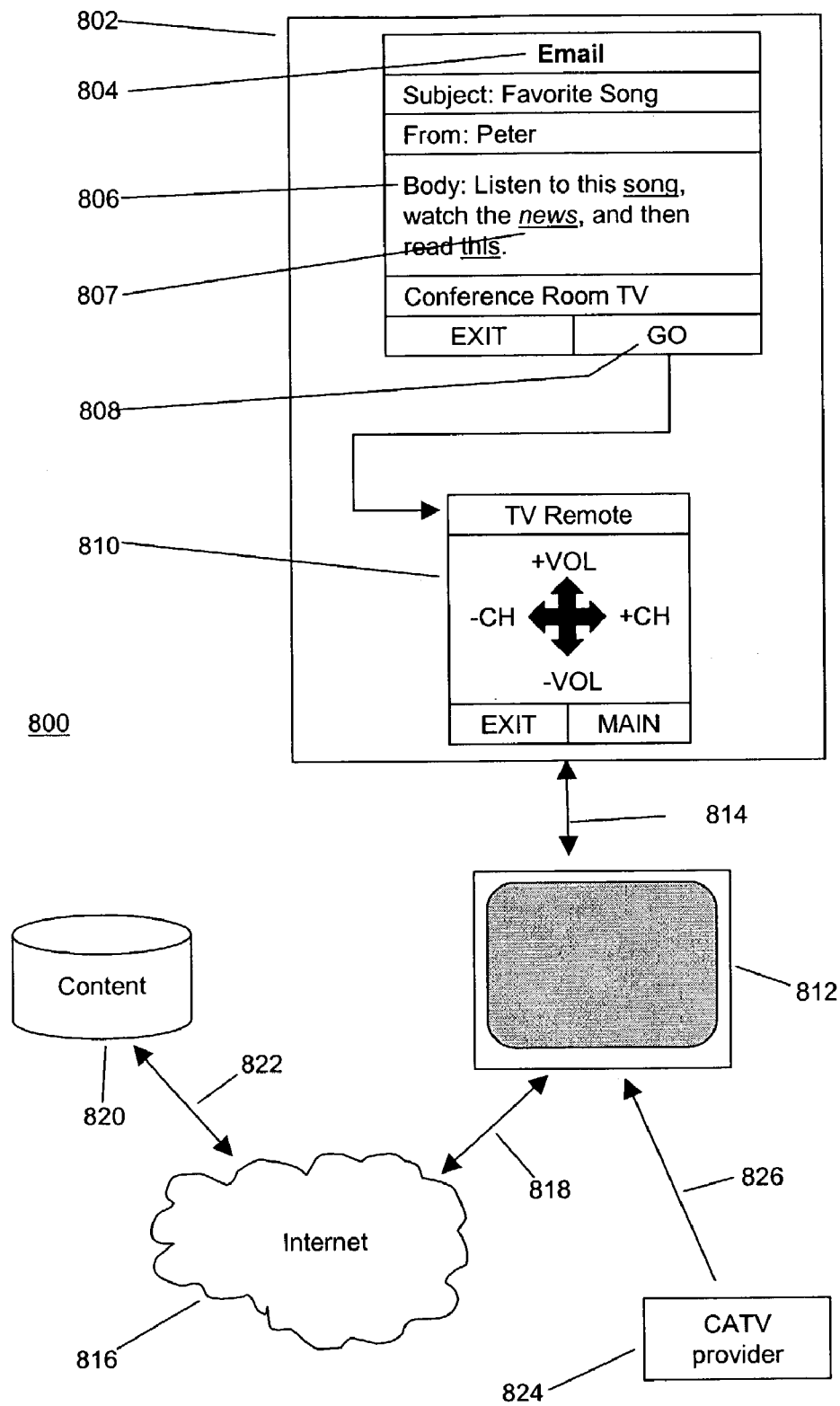
FIG. 8 depicts the delegation of content playback responsibility by a mobile to a network enabled intelligent television device.
Figure 9:
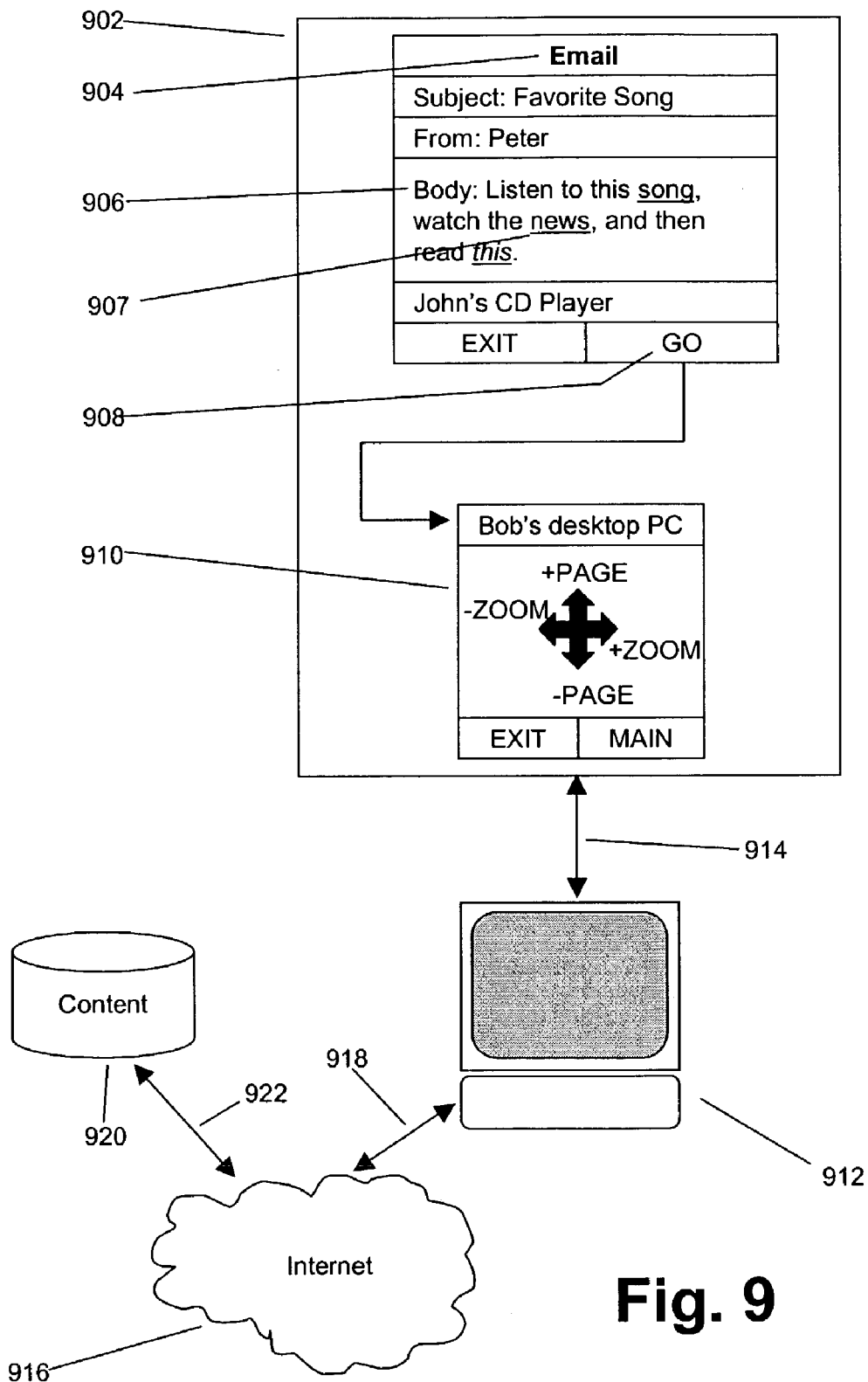
FIG. 9 depicts the delegation of content playback responsibility from a mobile to a desktop personal computer.

A few of many possible use scenarios are depicted in FIG. 7, FIG. 8, and FIG. 9. In these examples, a fictional mobile user reads an email text which has links to various media formats within it including audio, video, and a lengthy text document. It will be assumed that these media formats cannot be played back or displayed conveniently on the mobile device.

In the example of FIG. 7, the mobile device 702 has completed discovery handshaking with the mobile CD player 712 via a RF link 714. The CD player 712 is both willing and able to handle an audio file "song." In this example, the mobile device 702 displays an email window 704 with a body text 706 and a link 707. When the embedded link 707 song is selected using the mobile interface (e.g., the user could select the link with a single click; select the link and press the "go" button 708; or by implement another selection process), a message is sent requesting the content behind the link and a CD player control window 710 may be displayed. Once the message has been delivered and the content sent to the CD player 712, the player begins content playback. In this example, the control pointing to the 3 o'clock position selects PLAY if activated once and selects track skip if activated twice in succession. The control pointing to the 9 o'clock position selects STOP if activated once and selects reverse track skip if activated twice in succession.

In several exemplary embodiments, the CD player 712 may be connected to the Internet 716 by a high speed Internet connection 718. A content store 720 may be accessed via a high speed Internet connection 722. The CD player 712 fetches song, using a reference where to locate the content which may be sent to it by the mobile 702, from the content store 720 via the Internet 716 and plays song back under remote control from the mobile 702.

In the example of FIG. 8, the mobile device 802 has completed discovery handshaking with a media device TV 812 via a RF link 814. The media device TV 812 is both willing and able to handle a video content file. In the example, the mobile device 702 displays an email window 804 with a body text 806 and a link 807. When the embedded link 807 news is selected using the mobile interface (e.g., the user could select the link with a single click; select the link and press the "go" button 808; or by implementing another selection process), a message is sent requesting the content behind the link and a TV Remote control window 810 may be displayed. Once the message has been delivered and the content sent to the media device TV 812, the media device 812 begins content playback. A television ("TV") control window 810 may be displayed allowing the user to control certain aspects of the playback. The TV 812 may be connected to an Internet 816 by a high speed Internet connection 818. A content store 820 may be accessed via a high speed Internet connection 822.

In several exemplary embodiments, the TV 812 fetches the file called "news," using a reference where to locate the content which may be sent to it by the mobile 802, from the content store 820 via the Internet 816. The TV 812 may play news back under remote control from the mobile 802. Note that in this example, the news content may be stored in a file format on a database accessible through the Internet. It is also possible that the content would be in a streaming format and would be accessed via a cable television ("CATV") service provider 824 over a cable link 826.

In the example of FIG. 9, the mobile device 902 has completed discovery handshaking with a personal computer "PC" 912 via a RF link 914. The PC 912 is both willing and able to playback a video content file. In the example, the mobile device 902 displays an email window 904 with a body text 906 and a link 907. When the embedded link 907 "this" is selected using the mobile interface (e.g., the user could select the link with a single click; select the link and press the "go" button 908; or by implementing another selection process), a message is sent requesting the content behind the link and a control window 910 may be displayed. Once the message has been delivered and the content sent to the media device PC 912, the media device 912 begins content playback. A television ("TV") control window 910 may be displayed allowing the user to control certain aspects of the playback. The PC 912 may be connected to an Internet 916 by a high speed Internet connection 918. A content store 920 may be accessed via a high speed Internet connection 922.

In several exemplary embodiments, the PC 912 fetches the file called "this," using a reference where to locate the content which may be sent to it by the mobile 902, from the content store 920 via the Internet 916. The PC 912 may play news back under remote control from the mobile 902.

Other embodiments of the present invention may involve other configurations of media device control windows with additional control functions. Other embodiments of the present invention may involve media device control windows which support a scrollable table of the content which may be available in the local content store 322 of the media device 300. Another aspect of an embodiment of the present invention may involve a media device which includes within it a store of music in digital format, which may be suitable to playing back this music in a public area for the audition of multiple persons and multiple groups of persons, whose function may be commanded by mobile devices via RF communications links, and which conducts a financial transaction with the mobile devices to charge for playback service on a per music unit basis or a per cluster of music unit basis (on a "per song" basis or on a "per three song" basis or other multiplicity basis, though the intention is not to limit this concept to what are called songs but to include any audio segments).

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A mobile device comprising:
a processor,
a wireless modem in communication with the processor, and
a memory in communication with the processor, wherein the memory comprises instructions for:
discovering a media device via a radio frequency (RF) link, wherein the media device communicates with the mobile device via the RF link,
displaying an electronic mail (e-mail) message having a first plurality of selectors, each of the first plurality of selectors corresponding to a media file accessible by the media device,
receiving a selection corresponding to one of the plurality of media files, and
sending a request via the RF link for delivery of the selected media file to the media device; and
controlling playback of the media file on the media device.

2. The mobile device of claim 1, wherein the instructions further comprise:
displaying a second plurality of selectors, each of the second plurality of selectors corresponding with a device control for the media device.

3. The mobile device of claim 1, wherein the sending a request for delivery comprises sending a request via a carrier network to a content server in communication with a public network.

4. The mobile device of claim 1, wherein the media device is a digital music player.

5. The mobile device of claim 1, wherein the media device is a television video player.

6. The mobile device of claim 1, wherein the media device is a personal computer.

7. A media device comprising:
a processor,
a wireless modem in communication with the processor, and
a memory in communication with the processor, wherein the memory comprises instructions for:
discovering a mobile device via a radio frequency (RF) link, wherein the media device communicates with the mobile device via the RF link,
receiving instructions via the RF link from the mobile device, the instructions comprising control data relating to the playback of a file, and
playing the file on the media device in accordance with the control data.

8. The media device of claim 7, wherein the memory further comprises instructions for receiving the file.

9. The media device of claim 8, wherein the file is received from a content database accessible from a public network.

10. The media device of claim 7 further comprising a network connection access interface in communication with the processor.

11. The media device of claim 7, wherein the control data comprises playing control parameter.

12. A multimedia controlled communication method comprising:
discovering a media device including establishing communication with the media device via a radio frequency (RF) link to a mobile device, identifying media formats which the media device supports, and identifying variables to control media device playback;
delegating via the RF link to the media device responsibility for playback of a media content including selecting the media device with a one-click selection and identifying to the media device the media content to be played back; and
controlling via the RF link playback of the selected media content using the identified media device playback control variables, wherein the mobile device communicates with the media device via the RF link.

13. The mobile device of claim 1, wherein the first plurality of selectors comprises a plurality of links.

* * * * *